June 1, 1971 W. A. STUTSKE 3,582,303
ROTARY PRESS-MOLDING METHOD FOR GLASS ARTICLES
Filed Sept. 16, 1968 3 Sheets-Sheet 1

INVENTOR.
WILLIAM A. STUTSKE
BY Tom Meehan
W. A. Scharich
ATTORNEYS

INVENTOR.
WILLIAM A. STUTSKE
BY
ATTORNEYS

United States Patent Office 3,582,303
Patented June 1, 1971

3,582,303
ROTARY PRESS-MOLDING METHOD FOR GLASS ARTICLES
William A. Stutske, Toledo, Ohio, assignor to Owens-Illinois, Inc.
Filed Sept. 16, 1968, Ser. No. 760,038
Int. Cl. C03b 9/18
U.S. Cl. 65—72     11 Claims

ABSTRACT OF THE DISCLOSURE

This application discloses a method for press-molding glass articles, e.g. television picture tube faceplates or other glass items of similar shape. The method employs incrementally indexing concentric tables, the inner table being a molding table with a first number of stations thereon, and the outer table being a cooling table with a second number of stations thereon. An article to be press-molded is advanced with the molding table, in unison with a movable mold which is located at one of the stations thereof and an aligned reciprocatable plunger in molding contact therewith, for a number of incremental steps of the table which is pre-selected to provide sufficient time for proper pressing of the article. After the predetermined number of incremental steps, the plunger is retracted and the mold and article therein are shifted, in unison, to a station on the cooling table, for incremental advancement therewith until the article has had sufficient time, at the rotational cycle time of the cooling table, to cool to a temperature adequate for removal from the mold. Thereupon the article is removed from the mold, a fresh gob of glass to be molded is added to the mold, and the mold is moved back to a station on the molding table to begin a repeat of the cycle. In the meanwhile, the same cycle has been initiated with a number of other molds. For a given number of inner table stations and a given number of outer table stations, articles may be molded with great flexibility as to production rate, pressing time and cooling time by varying the number of molds employed, the relative locations of the mold transfer positions, and the relative rotational directions of the indexing movements of the molding and cooling tables.

BACKGROUND OF THE INVENTION

Heavy press-molded glass articles, e.g. television picture tube faceplates, lighting globes, bowls and similar items, are commonly press-molded by means of rotary press-molding machines having one circular indexing table which indexes successive molds, each with a glass gob to be molded therein, into a molding position beneath a single, reciprocatory, non-indexing plunger. Such an arrangement is, inherently, limited as to productivity by the length of time which the plunger must be in contact with the article being molded for proper molding, as there is no provision for overlapping the molding cycles of successive articles.

According, to the present invention, however, articles may be press-molded at high productivity by a rotary press-molding machine while still providing for long periods of pressing time. This result is obtained by providing the molding table with a plurality of plungers which index in unison with the molding table, thereby allowing the press-molding cycle of a given article to start before pressing cycle of the preceding cycle has been completed. To satisfactorily achieve this result, however, it is also necessary to make provision for additional cycle time to allow the molded part to adequately cool in its mold before it is withdrawn therefrom, as the conventional molding technique described above utilizes the period of dwell of a molded article in its mold at several stations subsequent to the molding station to attain such cooling. In the present invention, therefore, an additional indexing cooling table is provided concentrically surrounding the molding table, and means are provided to transfer successive article-containing molds from the molding table to the cooling table at the end of the pressing cycle for indexing with the cooling table through a number of stations adequate to achieve proper cooling. Additional means are, of course also provided to transfer successive empty molds from the cooling table back to the molding table, after the cooled articles have been removed therefrom, for a repeat of the process. When equipment of this type is provided, great flexibility as to production rate, pressing time and cooling time can be built into the press-molding operation by varying the number of molds in use, the relative locations of the mold transfer positions and the relative rotational directions of the molding and cooling tables.

Accordingly, it is an object of the present invention to provide an improved method for press-molding a glass article. It is a further object of the present invention to provide a method for successively press-molding a plurality of glass articles in which the pressing of a given article is initiated before the pressing of the preceding article is terminated. It is yet a further object of the present invention to provide a method of pressing glass articles which is more flexible than methods heretofore employed with respect to production rate, pressing time and cooling time.

Further objects and a better understanding of the present invention will be apparent from the following description of the drawing, the detailed description of the drawing and the claims.

DETAILED DESCRIPTION OF THE INVENTION

Figure 1:
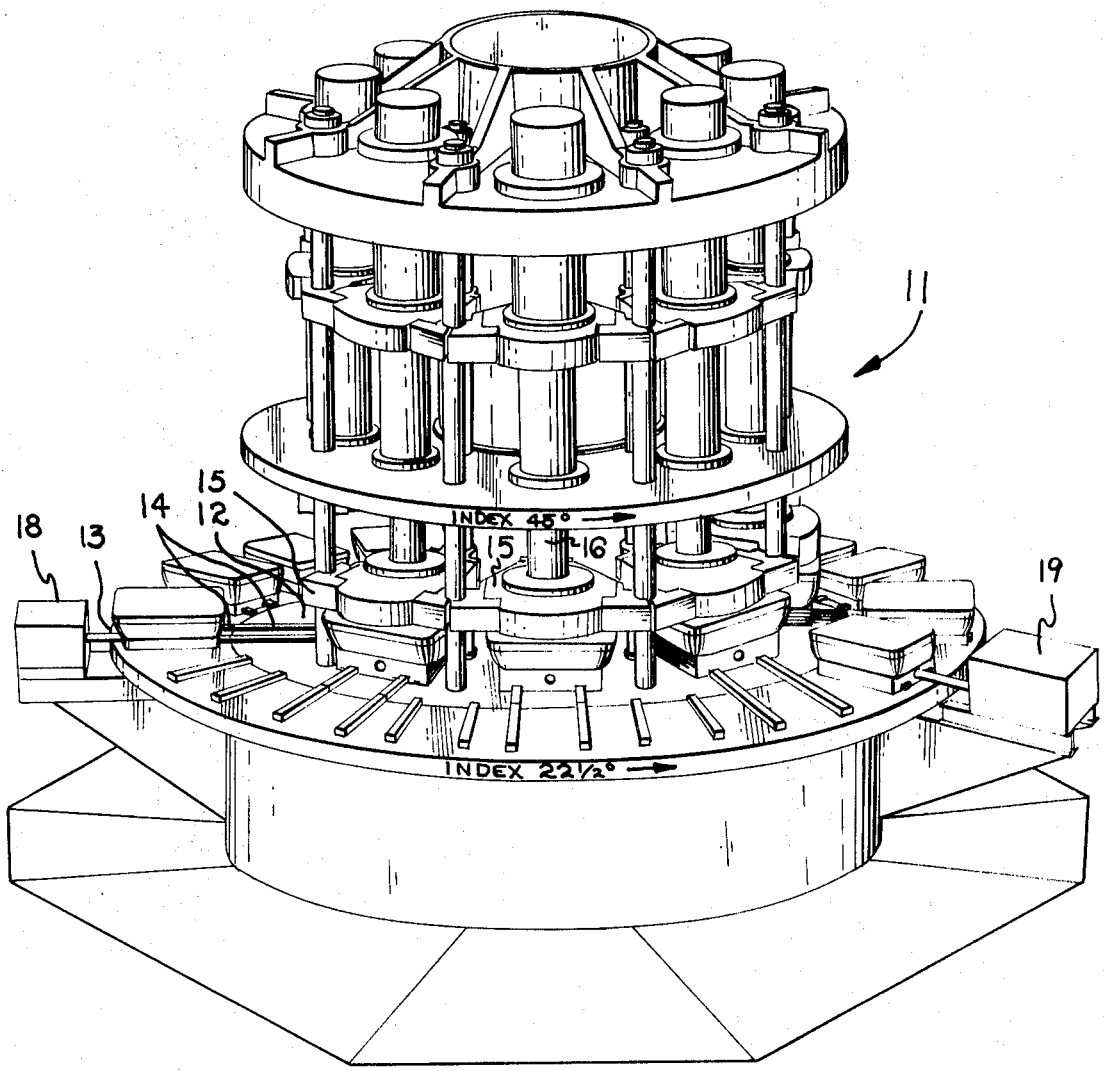
FIG. 1 is a perspective view of a rotary press-molding machine for practicing the press-molding method of the present invention.

Equipment for practicing the method of the present invention is shown in FIG. 1 and comprises a rotary press-molding machine, generally indicated by numeral 11. Machine 11 comprises an inner circular molding table 12 with a plurality (shown as eight) of stations located thereon at arcuately evenly spaced intervals (45° for an eight-station table) and equidistant from the center of rotation of the table. Rotary molding machine further comprises a circular cooling table 13 concentrically surrounding molding table 12 and having a plurality of stations (shown as sixteen) located thereon at arcuately evenly spaced intervals (22½° for a sixteen-station table) and equidistant from the center of rotation of the table. Located at each molding table station and at each cooling table station is radially extending track means 14, shown as comprising a pair of spaced parallel tracks, with the track means of each molding table station being aligned with the track means of a corresponding cooling table station to permit the transfer of an article mold at a station of a given table to the corresponding station of the other table along such track, at a time, for a purpose and in a manner which will be subsequently discussed in greater detail.

Molding table further comprising a molding plunger is 15 located above each molding table station. Each plunger is attached to the lower end of the cylinder rod 16 extending from the lower end of a vertically extending hydraulic cylinder 17. Consequently, each plunger may be reciprocated between a lower position, in pressing relationship with molten glass in a mold at the station therebeneath, and an upper or retracted non-pressing position by the withdrawal of high pressure hydraulic fluid from the portion of cylinder 17 on the upper side of the piston thereof, to retract the plunger, and the subsequent introduction of fluid into such space to lower the plunger. The flow of hydraulic fluid is, of course, controlled in a conventional and well understood manner by value devices (not shown) which may be actuated manually or, preferably, automatically by conventional devices, e.g. electro-mechanical switches, for initiating a given motion upon completion of another motion.

To obtain relatively continuous production from equipment described thus far, molding table 12, together with hydraulic cylinders 17, plungers 15 and the structure therefor, is constructed for repeated movement in a circular path in incremental steps and in operation, molding table 12 is advanced or indexed in such incremental steps, with a dwell period between successive steps, preferably by mechanical means (not shown) such as a conventional geneva drive mechanism. In the specific examples hereinafter given, molding table 12 is advanced counter-clockwise in single step or single-station increments (45° for an eight-station table). Cooling table 13 is also constructed for repeated movement in a circular path in incremental steps and, in operation, cooling table in advanced in such incremental steps, with a dwell period between successive steps which is substantially simultaneous with the dwell period between successive advancing steps of the molding table. Again, the incremental advancing movement of the cooling table may be accomplished by conventional mechanical means (not shown) and, in the examples given, the cooling table indexed in single station increments (22½° for a sixteen-station table), counter-clockwise in one set of examples and clockwise in the other set of examples.

Figure 2:
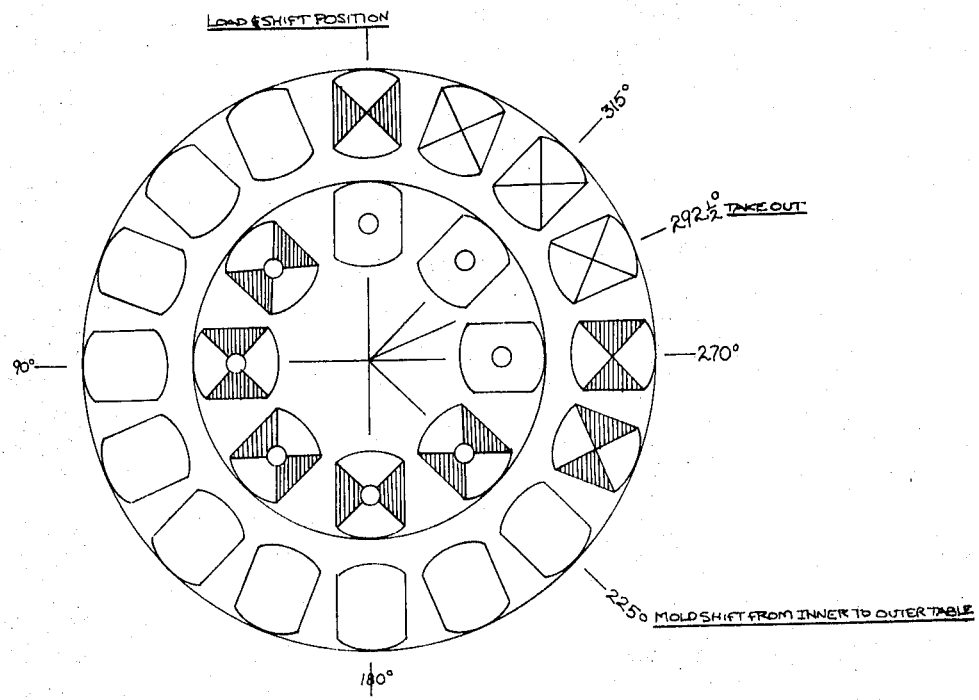
FIG. 2 is a schematic view illustrating an embodiment of a press-molding method according to the present invention, which method can be practiced with equipment of the type illustrated in FIG. 1.
Figure 3:
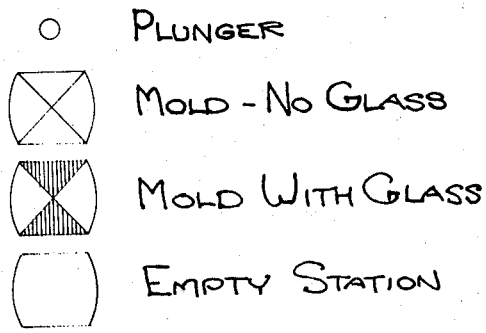
FIG. 3 is a legend identifying symbols used in FIG. 2.
Figure 4:
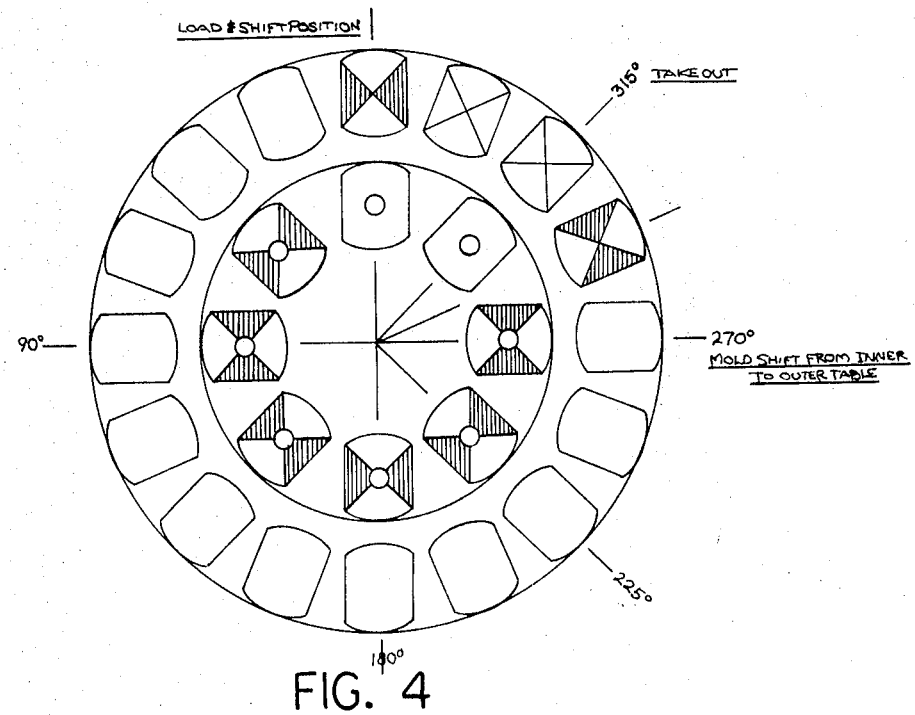
FIGS. 4 and 5 are schematic views similar to FIG. 2 illustrating alternative embodiments of a press-molding method according to the present invention.
Figure 5:
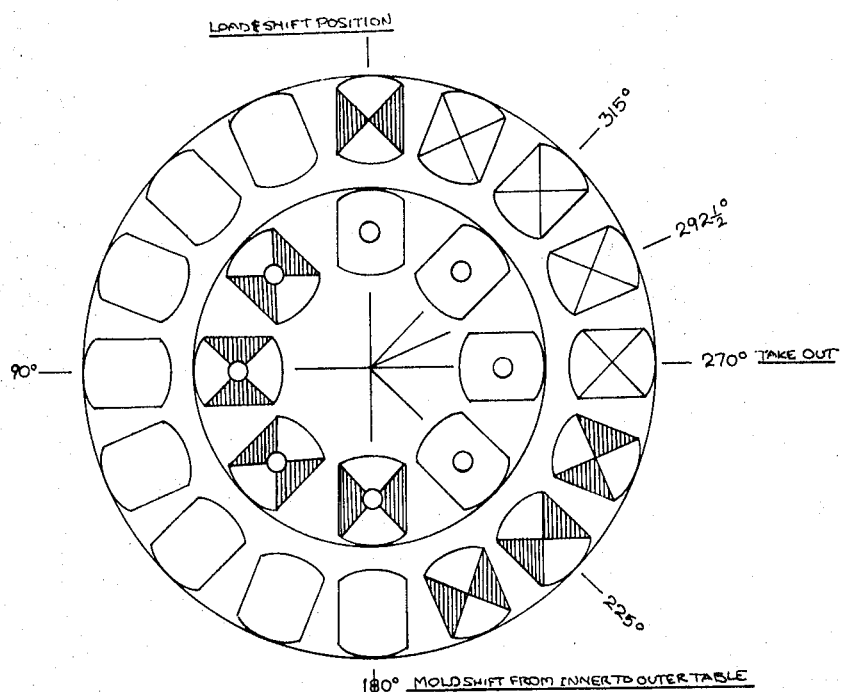

To initiate the operation, a gob of glass to be molded is added to a mold at a gob-loading station on the cooling table at a position which may be considered to be at 0° in the schematic arrangements of FIGS. 2, 4 and 5. The gob is added while the molding and cooling tables are at rest and, during same rest period, the mold is transferred from the cooling table to a transfer-in station of the molding table by mold transfer device 18, shown schematically and the plunger 15 and cylinder rod 16 of the hydraulic cylinder above the freshly-loaded gob are actuated to move the plunger downwardly into position to press-mold the gob in the mold therebelow into the desired form. Also, during the same rest period, the plunger is retracted from the mold at a mold table transfer-out station several stations removed from the gob loading station and the mold at the transfer-out station, with the molded article therein, is transferred to the cooling table by means of mold transfer device 19, shown schematically. After these steps have been performed, the mold table and the cooling table are each indexed by the predetermined incremental distances to bring an unloaded mold into position adjacent the gob loading station, to advance one of the molds on the molding table to the mold transfer-out station, to advance each of the other molds on the molding table one step nearer to the mold transfer-out station, to advance an article-containing mold on the cooling table to a cooling table station where the article therein is removed therefrom, to advance the other article-containing molds on the cooling table one-step nearer to the article removal station, to advance an empty mold on the cooling table back to a station to be again loaded with a fresh gob to be molded, and to advance the other empty molds on the cooling table, if any, one step nearer to the gob loading station. The pressed article in its mold on the cooling table may be allowed to cool naturally by radiation and convection to ambient surroundings, or cooling may be accelerated by providing means (not shown) to forcibly cool the article, as by directing streams of cool air against the underside of the molds at the cooling table cooling stations.

As is shown in FIGS. 2, 4 and 5 and in Tables I and II, the relative locations of the mold loading and unloading stations, assuming location of the gob loading station at the 0° position in all instances as a common base for the examples and, the relative rotational directional of indexing movement of the molding and cooling tables, assuming counterclockwise movement of the molding table in all instances, may be varied to provide a wide selection of pressing and cooling cycles at a wide variety of production rates. Table I and FIGS. 2, 4 and 5 illustrate a number of possible cycles assuming indexing movement of the cooling table in the same rotational direction as the molding table (viz, counterclockwise indexing). Table II indicates additional possible cycles assuming indexing of the cooling table in the opposite direction of the molding table (viz. clockwise indexing). In FIG. 2, the mold with a pressed article therein is transferred from the molding table to the cooling table at the 225° position, or after five incremental advancing steps with the molding table. FIGS. 4 and 5 show the transfer of a mold from the molding table to the cooling tables at the 270° and 180° positions (after six steps and four steps), respectively. It will be noted from FIGS. 2, 4 and 5 that the number of molds employed for the cycles which these figures schematically represent are different. Thus, the cycle of FIG. 2 employs eleven molds, the cycle of FIG. 4, ten molds, and the cycle of FIG. 5, twelve molds. In the cycle of FIG. 2 the article is removed from its mold at the 292½° station of the cooling table, three stations past the mold removal station. In the cycles of FIGS. 4 and 5, the article is removed, respectively, at the 315° and the 270° positions, which are four stations and two stations, respectively, past the mold removal station.

Table I below lists, in tubular form, the operating characteristics of the arrangements of FIGS. 2, 4 and 5 for production rates, in pieces per minute, of four, six, eight, ten, and twelve assuming, in all instances, a minimum three-second dwell between successive indexing movements of the molding and cooling tables, the time it takes to load a gob and to transfer the loaded mold to the molding table. The mold removal and article take-out positions are tabulated in degrees, in reference to the arrangements of FIGS. 2, 4 and 5 using the gob loading station as zero degrees. The pressing cycle is the period of time, in seconds, during which the plunger is in molding contact with the article in the mold. The cooling cycle is the period of time, in seconds, from the transfer of an article-containing mold from the molding table to the cooling table until the article is removed therefrom, assuming instantaneous mold removal and article removal at the same instant during each dwell cycle. The total cycle is the time, in seconds, taken by each mold as it is indexed from the loading station through the various stations of the molding and cooling tables back to the gob loading station. It will be noted from the tabulated data that the ratio of the cooling cycle for each itemized production rate can be varied from a valve substantially in excess of unity, to a valve approximating unity, to a valve substantially less than unity as the number of molds in use is varied from ten, to eleven, to twelve. This allows great flexibility in adjusting the operation of a given molding machine to meet the pressing and cooling requirements which are particular to the type of article than being produced.

TABLE I

| Pieces per. min. | Mold removal (degrees) | Pressing cycle (sec.) | Cooling cycle (sec.) | Article removal (degrees) | Total cycle (sec.) | No. of molds |
|---|---|---|---|---|---|---|
| 4 | 270 | 75 | 45 | 315 | 150 | 10 |
| 4 | 225 | 60 | 60 | 292½ | 165 | 11 |
| 4 | 180 | 45 | 75 | 270 | 180 | 12 |
| 6 | 270 | 50 | 30 | 315 | 100 | 10 |
| 6 | 225 | 40 | 50 | 315 | 110 | 11 |
| 6 | 180 | 30 | 60 | 219½ | 120 | 12 |
| 8 | 270 | 37½ | 22½ | 315 | 75 | 10 |
| 8 | 225 | 30 | 37½ | 292½ | 82½ | 11 |
| 8 | 180 | 22½ | 45 | 292½ | 90 | 12 |
| 10 | 270 | 30 | 18 | 315 | 60 | 10 |
| 10 | 225 | 24 | 24 | 14 | 66 | 11 |
| 10 | 180 | 18 | 30 | 270 | 72 | 12 |
| 12 | 270 | 25 | 15 | 315 | 50 | 10 |
| 12 | 225 | 20 | 25 | 315 | 55 | 11 |
| 12 | 180 | 15 | 30 | 14 | 60 | 12 |

Table II below lists information of the type tabulated in Table I, at production rates of four, six, eight, ten, twelve and fifteen articles per minute, for the press molding of articles by equipment of the type illustrated in FIG. 1, in which the cooling table is indexed in the opposite rotational direction to the rotational direction of the molding table indexing. This arrangement makes it possible to employ a greater number of molds in the molding operation, e.g. a minimum of twelve molds and a maximum of twenty one molds. In using added molds, the total cycle time is increased, thereby making it possible to obtain both long pressing cycles and long cooling cycles, even at high production rates.

TABLE II

| Pieces per. min. | Mold removal (degrees) | Pressing cycle (sec.) | Cooling cycle (sec.) | Article removal (degrees) | Total cycle (sec.) | No. of molds |
|---|---|---|---|---|---|---|
| 4 | 270 | 75 | 135 | 270 | 270 | 18 |
| 4 | 225 | 60 | 105 | 270 | 225 | 15 |
| 4 | 180 | 45 | 75 | 270 | 180 | 12 |
| 6 | 270 | 50 | 90 | 270 | 180 | 18 |
| 6 | 225 | 40 | 80 | 292½ | 150 | 15 |
| 6 | 180 | 30 | 60 | 292½ | 120 | 12 |
| 8 | 270 | 37½ | 75 | 292½ | 135 | 18 |
| 8 | 225 | 30 | 60 | 292½ | 112½ | 15 |
| 8 | 180 | 22½ | 45 | 292½ | 90 | 12 |
| 10 | 315 | 36 | 72 | 292½ | 126 | 21 |
| 10 | 270 | 30 | 60 | 292½ | 108 | 18 |
| 10 | 225 | 24 | 48 | 292½ | 90 | 15 |
| 10 | 180 | 18 | 36 | 292½ | 72 | 12 |
| 12 | 315 | 30 | 65 | 315 | 105 | 21 |
| 12 | 270 | 25 | 55 | 315 | 99 | 18 |
| 12 | 225 | 20 | 45 | 315 | 75 | 15 |
| 12 | 180 | 12 | 28 | 215 | 48 | 12 |

While the invention has been described with reference to specific methods which may be practiced by a particular embodiment of equipment, it is to be understood that other equipment arrangements may be utilized in the practice of the method of the invention, and that modified methods may be practiced by similar equipment, without departing from the spirit of the invention or from the scope of the claims.

I claim:
1. The method of pressing glass parts comprising, the steps of:
providing a horizontally oriented molding table which has circular series of arcuately evenly spaced stations and a complemental series of vertically reciprocatable mold plungers, each of which is reciprocatable into and out of press-molding engagement with a mold located at a molding station;
providing a cooling table concentrically surrounding the molding table and comprising a circular series of arcuately evenly spaced stations;
loading a gob of glass to be molded into an empty mold located at a gob-loading station on the cooling table;
transferring the mold with the freshly loaded gob from the cooling table to an adjacent mold transfer-in station of the molding table when the tables are at rest and when the mold plunger at such molding table station is in an elevated, non-molding position;
downwardly moving the molding plunger at the mold transfer-in station into molding engagement with the gob in the mold therebelow;
intermittently indexing the molding table in incremental steps to concurrently advance a mold with its associated plunger in molding position from the mold transfer-in station to a mold transfer-out station;
retracting the plunger from molding contact with the mold and the molded article therein at the mold transfer-out station and transferring the mold and the article therein from the molding table to an adjacent station on the cooling table;
intermittently indexing the cooling table in incremental steps to advance a mold from the position on the cooling table adjacent to the mold transfer-out station to a position corresponding to the gob loading station; and
removing a pressed article from the mold while the mold is still on the cooling table.

2. The method according to claim 1 wherein a plurality of molds are provided, wherein the molding and cooling tables are maintained in a stationary position for a predetermined time interval following each incremental advance, wherein the time intervals are substantially simultaneous, wherein an empty mold is transferred from the cooling table to the molding table during each time interval, and wherein another mold with a pressed article therein is transferred from the molding to the cooling during each time interval.

3. The method according to claim 1 wherein: the molding table comprises eight stations, wherein the cooling table comprises sixteen stations, wherein the molding table is advanced in 45° increments, in a given rotational direction and wherein the cooling table is advanced in 22½° increments in the same rotational direction.

4. The method according to claim 3 wherein the mold is transferred from the molding table to the cooling table at the end of the sixth incremental advance after the mold has been loaded.

5. The method according to claim 3 wherein the mold is transferred from the molding table to the cooling table at the end of the fifth incremental advance after the mold has been loaded.

6. The method according to claim 3 wherein the mold is transferred from the molding table to the cooling table at the end of the seventh incremental advance after the mold has been loaded.

7. The method according to claim 2 wherein the molding table comprises eight stations, wherein the cooling table comprises sixteen stations wherein the molding table is advanced in 45° increments in a given rotational direction, and wherein the cooling table is advanced in 22½° increments in the other rotational direction.

8. The method according to claim 7 wherein the mold is transferred from the molding table to the cooling table at the end of the seventh incremental advance after the mold has been loaded.

9. The method according to claim 7 wherein the mold is transferred from the molding table to the cooling table at the end of the fourth incremental advance after the mold has been loaded.

10. The method according to claim 7 wherein the mold is transferred from the molding table to the cooling table at the end of the fifth incremental advance after the mold has been loaded.

11. The method according to claim 7 wherein the mold is transferred from the molding table to the cooling table at the end of the fourth incremental advance after the mold has been loaded.

References Cited

UNITED STATES PATENTS

| 723,589 | 3/1903 | Duffield | 65—310 |
| 1,657,921 | 1/1928 | Glaspey | 65—309 |
| 2,009,994 | 2/1966 | Cramer | 65—309 |

S. LEON BASHORE, Primary Examiner

R. L. LINDSAY, JR, Assistant Examiner

U.S. Cl. X.R.

65—84, 85, 122, 308, 309, 310, 320, 348

PO-1050
(5/69)

UNITED STATES PATENT OFFICE
CERTIFICATE OF CORRECTION

Patent No. 3,582,303          Dated June 1, 1971

Inventor(s) William A. Stutske

It is certified that error appears in the above-identified patent and that said Letters Patent are hereby corrected as shown below:

Column 3, line 47, "in" first occurrence, should read --is--;

column 4, line 58, "tubular" should read -- tabular --;

column 6, line 66 (Claim 6, line 3), "seventh" should read --fourth--; and column 7, line 5 (Claim 9, line 3), "fourth" should read -- sixth --.

Signed and sealed this 26th day of October 1971.

(SEAL)
Attest:

EDWARD M. FLETCHER, JR.      ROBERT GOTTSCHALK
Attesting Officer               Acting Commissioner of Patents